March 25, 1941.　　　G. W. CURTIS　　　2,235,960
APPARATUS FOR STAMPING FLEXIBLE MATERIALS
Filed Nov. 13, 1937　　　2 Sheets-Sheet 1
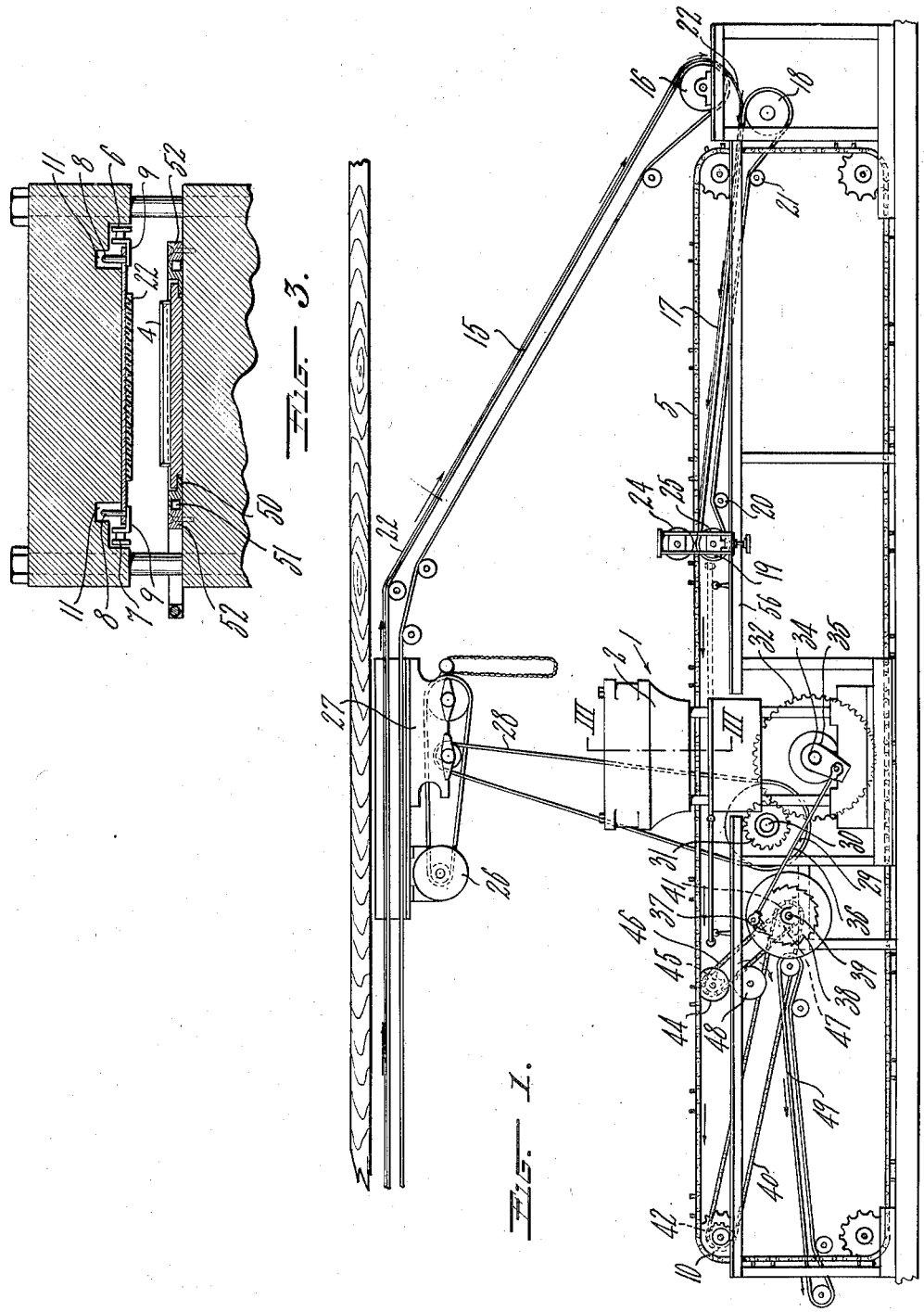
INVENTOR
GORDON W. CURTIS
By Younley & Bradley
Attorneys March 25, 1941. G. W. CURTIS 2,235,960
APPARATUS FOR STAMPING FLEXIBLE MATERIALS
Filed Nov. 13, 1937 2 Sheets-Sheet 2
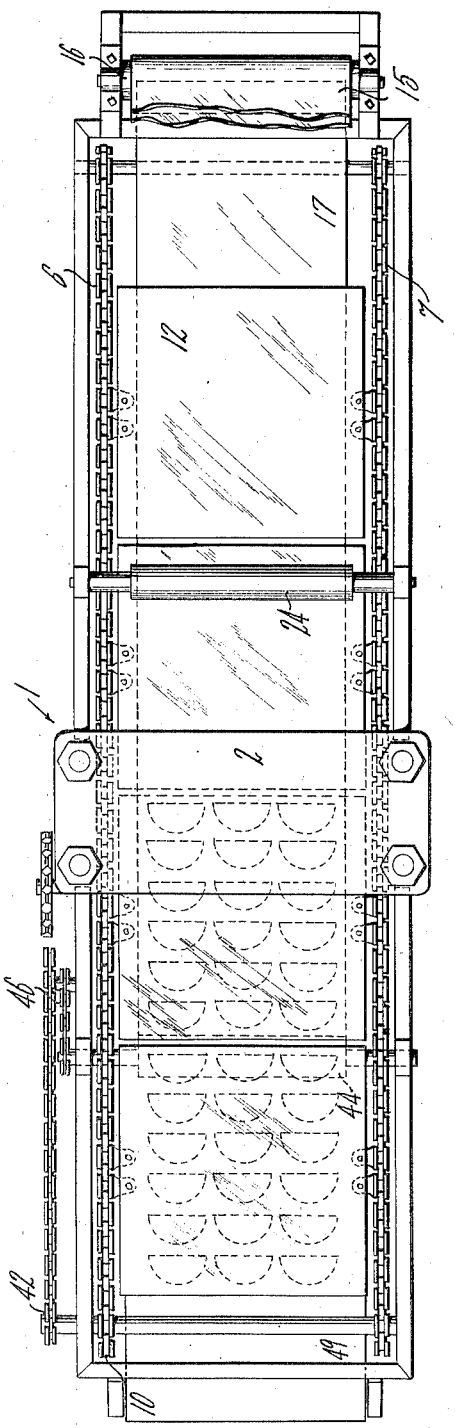
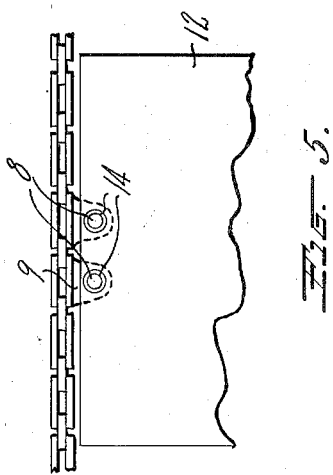
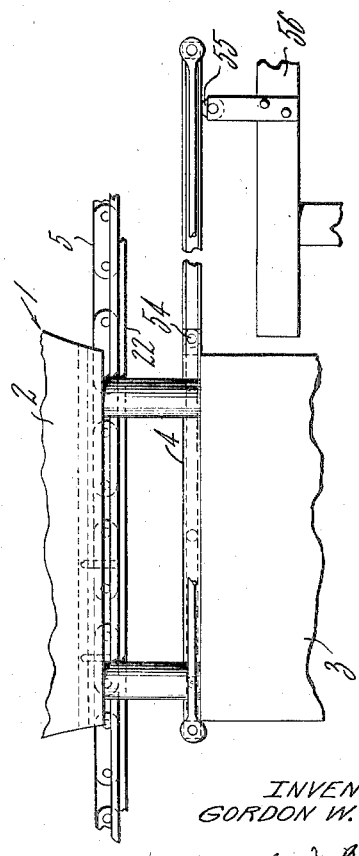
INVENTOR
GORDON W. CURTIS
By Journey & Budley
Attorneys Patented Mar. 25, 1941

2,235,960

UNITED STATES PATENT OFFICE 2,235,960

APPARATUS FOR STAMPING FLEXIBLE MATERIALS

Gordon W. Curtis, Naugatuck, Conn., assignor, by mesne assignments, to United States Rubber Company, New York, N. Y., a corporation of New Jersey Application November 13, 1937, Serial No. 174,428

8 Claims. (Cl. 164—19)

My invention relates to apparatus for stamping flexible materials, preferably sheet materials. More particularly, the invention relates to an apparatus for stamping such materials, and specifically rubber sheets, while in a suspended condition.

In stamping flexible materials on a conveyor it has heretofore been customary practice to support the material on supporting surfaces carried by the conveyor while the material is resting on the supporting surfaces. In such constructions it is usual for the cutting die to descend and engage and press the material against the supporting surface. The cutting action causes some distortion or stretching of the material during the cutting operation. This is especially true if the material lies on the supporting surfaces in a slightly wrinkled or uneven condition.

I have found that by suspending the material before being cut, the material is not stretched or distorted since the cutting action is constantly and continuously in a straight line against the supporting surfaces. The material has thus less tendency to crawl during the cutting operation and the conveyor is less liable to give or move. This action is particularly pronounced in long strips, since the suspended rubber material, if moved at all, is moved back toward a plane surface defined by a fixed plate, instead of being moved out of the plane surface and stretched. Accordingly, I have found that by cutting the material while suspended there is less likelihood of imperfectly shaped cut-outs due to the subsequent shrinking. The apparatus of my invention is particularly useful in cutting out shoe parts from sheet rubber composition.

The accompanying drawings illustrate a present preferred embodiment of apparatus for practicing my invention, in which:

Fig. 1 is a semi-diagrammatical side elevational view of the apparatus;

Fig. 2 is a top plan view thereof;

Fig. 3 is a sectional view through the press taken along the section line III—III of Fig. 1;

Fig. 4 is a side elevational view of die changing mechanism; and

Fig. 5 is a detail view of a portion of the conveyor with an attached cutting support or mat.

Referring to the drawings, a press I comprises an upper stationary plate or platen 2 and a lower reciprocating platen 3 carrying a cutting die 4. The plate 2 is supported by a conventional frame. An endless conveyor 5 comprises a pair of parallel chains 6 and 7 having pairs of offset pins 8 projecting outwardly from various chain links. The pins 8 are supported and offset from the chain links by flanges 9. The conveyor 5 is trained around a plurality of sprocket wheels 10. The upper reach of the conveyor is in close proximity to the lower face of the plate 2 and the latter is provided with recesses 11 for receiving the chain links and pins 8.

Referring particularly to Fig. 5, supporting surfaces or cutting mats 12 are provided with openings 14 for reception of the supporting pins 8 which carry them beneath the platen 2, as particularly shown in Fig. 3. The pins 8 are inserted in pairs at each side of and near the center of each mat. The mats are preferably of sufficient size so that on each cutting operation of the die 4 a considerable number of parts are formed. The mats 12 are manually applied at the right hand end of the upper reach of the conveyor 5, as viewed in Fig. 1, and are manually removed at the left hand end thereof.

The material to be cut, preferably in the form of rubber sheets, is led from a calendar or other source, not shown, by a conveyor 15 trained around a pulley 16 so that it is deposited on the upper surface of a conveyor 17. The conveyor 17 is trained around pulleys 18 and 19 and over the pulleys 20 and 21. After an initial manual threading, the conveyor 17 leads the material 22 to a pair of press rolls 24 and 25 through which the upper reach of the conveyor 5 passes after the mats 12 have been placed thereon. The material 22 is pressed against the lower surface of the mats so that it adheres thereto by its tackiness and is in a suspended condition. The mats are then advanced to the press 1.

The conveyor and the press are driven from a source of power 26 through a reduction gear or a speed controlling device 27, such as a Reeves drive, by a belt 28 engaging a pulley 29 mounted on a shaft 30. A gear 31 on the shaft 30 meshes with a gear 32 on a shaft 34 forming a part of the press 1 and for reciprocating the platen 3 in a well known manner. A crank arm 35 on the shaft 34 is connected by a link 36 to a pawl 37 so that the latter is reciprocated. The pawl 37 engages a ratchet 38 on a shaft 39. A chain 40 is driven by a sprocket wheel 41 on the shaft 39 and engages a sprocket wheel 42 associated with one of the sprocket wheels 10 to propel the conveyor 5.

For removing scrap material from the mats after the cutting operation, a roller 44, around which the scrap is trained, is mounted beneath the upper reach of the conveyor. The roller 44 is driven by a sprocket wheel 45 through a chain 46 meshing with a sprocket wheel 47 on the shaft 39. From the roller the free material travels around a second roller 48 and is deposited on a take-off conveyor 49. The conveyor 17 is driven because of its engagement with the moving conveyor 5. The cut-out blanks adhere to the mats 12 and are removed therewith for subsequent use.

Accordingly, the conveyor 5, the reciprocating platen 3, and the conveyor 17 are driven in synchronism. Preferably, the cutting and stamping operation takes place during the periods of dwell on the conveyor 5 in accordance with the movement of the pawl 37.

Referring particularly to Figs. 3 and 4, the cutting die 4 is mounted on a die holder 50 which slides on rollers 51 secured to side bars 52. Two of the die holders 50 are connected by a hinge connection 54 so that different dies may quickly be shoved into place on the platen 3 by an operator. The idle die holder rests on a roller 55 mounted on a support 56 adjacent to the press so that the reciprocating movement of the platen 3 is not interrupted. This is particularly important where the material 22 is being continuously fed from a calender.

In the operation of the apparatus the suspended material on each mat is brought beneath the plate 2 and the opposite moving platen 3. On each reciprocation of the platen 3 the material 22 is cut in accordance with the shape of the die 4. By reason of suspended condition of the material there is very little creeping or distortion thereof, as compared to the cutting of the material when it is supported on top of the mats. I believe that one reason for this action is that the material in a suspended condition tends to depart from a horizontal plane and, during the cutting action, is brought back to that plane or into a more natural state. When a press engages a supported mat, the mat tends to move out of such a horizontal plane or to shift with the result that the rubber sheet material is distorted. Also there is less likelihood of creeping or folding in a suspended material, than when the material is resting on a smooth surface under the influence of the force of gravity. In any event, the apparatus embodied in the present invention results in a fewer rejected parts due to distortion or mis-shapement caused by the cutting operation. Also, the removal of the scrap of the material while under the influence of the force of gravity is less likely to derange the cut-out pieces, as against a condition where the scrap is lifted over the cut-out pieces.

While I have shown and described a present preferred embodiment of apparatus for practicing my invention, it is to be understood that it may otherwise be embodied within the spirit of the invention and the scope of the appended claims.

Having thus described my invention, what I claim and desire to protect by Letters Patent is:

1. In a cutting machine, a fixed platen, a conveyor cooperating with one face of the platen and holding material in a suspended state, a cutting die and means for moving the cutting die upwardly against the material and platen.

2. In a cutting machine, a fixed platen, a conveyor cooperating with one face of the platen, mats carried by the conveyor and holding material in a suspended state, a cutting die and means for moving the cutting die upwardly against the material and the mats.

3. In a cutting device a conveyor, pins projecting laterally of the conveyor and cutting mats having openings registering with the pins supported by the conveyor.

4. In a cutting device a conveyor, pins projecting laterally of the conveyor and cutting mats having openings registering with the pins supported by the conveyor when the pins project vertically and upwardly.

5. In a cutting device a conveyor, pins projecting laterally of the conveyor and cutting mats having openings registering with the pins supported by the conveyor, means for supplying material to the mats on the conveyor and means for removing scrap material.

6. In a cutting device a conveyor, pins projecting laterally of the conveyor and cutting mats having openings registering with the pins supported by the conveyor, means for supplying material to the mats on the conveyor and adhering it thereto in a suspended condition, a reciprocating die, and means for removing scrap material after a cutting operation by the die.

7. In a cutting device a conveyor, pins projecting laterally of the conveyor, cutting mats having openings registering with the pins supported by the conveyor, means for supplying material to the mats on the conveyor and causing it to cling thereto in a suspended condition, a reciprocating die, and means for removing scrap material with the assistance of the force of gravity after the operation of the die.

8. In a cutting device, a conveyor, cutting mats carried by said conveyor so that the bottom surfaces of said mats are exposed, means for temporarily adhering adhesive material to said bottom surfaces, a fixed platen adapted to cooperate with the top surface of said mats, means for moving said conveyor in a step by step movement underneath said fixed platen, a vertically reciprocating die, means for moving said die upwardly against said material when it is at rest, and means for pulling the scrap material downwardly from the bottom surface of the mats to remove the scrap from around the cut out pieces which remain on the mats.

GORDON W. CURTIS.